(12) United States Patent
Fraeger (10) Patent No.: US 8,421,389 B2
(45) Date of Patent: Apr. 16, 2013

(54) DRIVING WITH INVERTERS WITH LOW SWITCHING LOSSES

(75) Inventor: Carsten Fraeger, Hammeln (DE)

(73) Assignee: Lenze Drives GmbH, Extertal (DE)

( * ) Notice: Subject to any disclaimer, the term of this patent is extended or adjusted under 35 U.S.C. 154(b) by 672 days.

(21) Appl. No.: 12/304,793

(22) PCT Filed: Jun. 15, 2007

(86) PCT No.: PCT/EP2007/055983
§ 371 (c)(1),
(2), (4) Date: Feb. 3, 2010

(87) PCT Pub. No.: WO2007/144431
PCT Pub. Date: Dec. 21, 2007

(65) Prior Publication Data
US 2010/0141190 A1    Jun. 10, 2010

(30) Foreign Application Priority Data

Jun. 15, 2006  (DE) .................. 10 2006 027 716

(51) Int. Cl.
*H02P 6/14* (2006.01)
(52) U.S. Cl.
USPC ............ 318/400.27; 318/400.01; 318/400.26; 318/700; 363/13; 363/39; 363/65; 363/71
(58) Field of Classification Search ............. 318/400.01, 318/400.26, 400.27, 700; 363/13, 39, 65, 363/71
See application file for complete search history.

(56) References Cited

U.S. PATENT DOCUMENTS

| | | | |
|---|---|---|---|
| 4,328,429 A | 5/1982 | Kublick | |
| 5,237,208 A | 8/1993 | Tominaga et al. | |
| 5,657,217 A * | 8/1997 | Watanabe et al. | ............... 363/71 |
| 5,949,669 A | 9/1999 | Bruckmann et al. | |
| 6,107,774 A * | 8/2000 | Yamada et al. | ............... 318/807 |
| 6,147,462 A | 11/2000 | Sing et al. | |
| 6,242,884 B1 * | 6/2001 | Lipo et al. | ..................... 318/808 |

(Continued)

FOREIGN PATENT DOCUMENTS

| | | |
|---|---|---|
| DE | 29 04 786 B1 | 6/1980 |
| DE | 29 11 342 A1 | 9/1980 |

(Continued)

OTHER PUBLICATIONS

International Search Report for PCT/EP2007/055983 mailed Oct. 23, 2007, 2 pages.

*Primary Examiner* — Kawing Chan
(74) *Attorney, Agent, or Firm* — Hunton & Williams LLP (57) ABSTRACT

The invention relates to converters (inverters, pulse or frequency converters) and to driving "magnetically active" operating means. According to one embodiment, a circuit arrangement for feeding the operating means in at least one first winding phase (S1), comprises a first branch (Z1) of a frequency converter (WR1) adapted for and operable at a switching frequency of not higher than 5 kHz for outputting a main alternating current generated at said switching frequency and having a substantially lower operating frequency ($f_1$) to a winding (L1). A second branch (z1) of another frequency converter (WR2) is adapted for and operable at a second switching frequency of more than 5 kHz for outputting a supplementary alternating current generated at said switching frequency to the same winding (L1). In the at least one winding (L1), the two alternating currents ($i_{A(t)}$; $i_{B(t)}$) of the two branches (Z1, z1) are superimposed to form a sum current.

36 Claims, 5 Drawing Sheets

U.S. PATENT DOCUMENTS

| | | | |
|---|---|---|---|
| 6,492,790 B2 * | 12/2002 | Yoshikawa et al. | 318/727 |
| 6,573,672 B2 * | 6/2003 | O'Rourke et al. | 318/400.21 |
| 8,084,972 B2 * | 12/2011 | Strong et al. | 318/400.17 |
| 2001/0022736 A1 * | 9/2001 | Suzuki | 363/69 |
| 2003/0039132 A1 | 2/2003 | Engler | |
| 2005/0067984 A1 * | 3/2005 | Makinen et al. | 318/78 |
| 2005/0088861 A1 | 4/2005 | Baumgart | |
| 2005/0179419 A1 * | 8/2005 | Ollila | 318/801 |
| 2009/0134828 A1 * | 5/2009 | Chakrabarti et al. | 318/440 |
| 2011/0181219 A1 * | 7/2011 | Liegeois et al. | 318/400.29 |

FOREIGN PATENT DOCUMENTS

| | | |
|---|---|---|
| DE | 29 15 222 A1 | 10/1980 |
| DE | 33 12 768 A1 | 10/1984 |
| DE | 36 02 496 A1 | 7/1987 |
| DE | 37 14 175 A1 | 11/1988 |
| DE | 39 35 564 A1 | 4/1990 |
| DE | 40 23 207 C1 | 4/1991 |
| DE | 195 36 470 A1 | 4/1997 |
| DE | 101 40 783 A1 | 4/2003 |
| EP | 0 435 460 B1 | 7/1991 |
| EP | 0 684 685 B1 | 11/1995 |
| EP | 0 852 842 B1 | 7/1998 |
| EP | 0 951 204 B1 | 10/1999 |
| EP | 1 575 156 | 9/2005 |
| GB | 2 137 832 A | 10/1984 |
| JP | 06 225539 A | 8/1984 |
| JP | 05 115106 | 5/1993 |

* cited by examiner

DRIVING WITH INVERTERS WITH LOW SWITCHING LOSSES

CROSS-REFERENCE TO RELATED APPLICATIONS

This application is a U.S. National Stage Application of International Application No. PCT/EP2007/055983, filed Jun. 15, 2007, which claims the benefit of German Patent Application No. DE 10 2006 027 716.3, filed on Jun. 15, 2006, the disclosure of which is herein incorporated by reference in its entirety.

BACKGROUND OF THE INVENTION

The invention relates to converters (inverters, pulse or frequency converters) and to the driving of, for example, machines and is implemented in form of a device (circuit arrangement) or a method for feeding such a magnetically active operating means in the sense of a transformer, a motor/generator (more general: a machine). A driving arrangement is concerned with the regulation or control of said circuit arrangement.

High demands are made to electrically operated driving means as an example of "magnetically active", electrically operable operating means, on the one hand, regarding the noise behavior and, on the other hand, regarding the dynamics of regulation provided by frequency converters and servo converters as inverters. These converters provide an alternating current generated by a high switching frequency which, in machines of high power of more than 10 kW to 30 kW and, in particular, in draft-ventilated motors, results in the occurrence of disturbing noise levels in the motors caused by feeding the converters at a too low switching frequency.

In order to avoid or at least reduce said noise levels, the pulse frequencies (=switching frequencies) of the inverters must be increased, which also increases the power loss in said inverters, if they are required to switch high load currents of the machines. This is implemented at a "high switching frequency" which may be higher than e.g. 8 kHz. If the inverters (converters) are switched at this frequency, the noise levels may be kept within acceptable limits at the cost of an increased power loss in the converters which consist of a plurality of branches each, wherein, mostly in three-phase machines having three magnetically active and electrically fed windings, a converter having three phases and adapted to said windings may also be used.

If highly dynamic driving means are used, e.g. linear motors or motors which are required to synchronize with a high speed of a belt or web moving past it, the high pulse frequency is not only useful for reducing the noise level, but is also required to enable realization of a fast current regulation of said highly dynamic driving means (as representatives of magnetically active operating means).

If this first or the second or the common goal is to be achieved today, high switching frequencies are inevitable in inverters which then, even at high output currents, lead to high switching frequencies and high cooling requirements. These high requirements are caused by the fact that the power semiconductors fulfilling the high switching frequency in the respective branches of the inverter are required to switch the high generator or motor load current of the machine at said high frequency so that the power semiconductors, transistors or IGBTs, have to be appropriately dimensioned and mounted accordingly in the cooling or for dissipating the produced heat.

BRIEF SUMMARY OF THE INVENTION

It is the object of the invention not to reduce an effective switching frequency of a converter or inverter for a "magnetically active" operating means, for example an electric machine, but nevertheless to achieve a reduction in cooling requirements, in particular, also in driving the converter. Reducing the cooling requirements is to be understood as involving three aspects, firstly reducing the production of heat, then reducing the necessary dissipation of heat, for example by the shape of the cooling elements, and thirdly reducing the area required for dissipation. In other words, "the cooling requirements" for properly driven and operated power semiconductors in the inverter are to be reduced. If this can be achieved while not or non-essentially having to reduce the switching frequency in order to keep the noise levels generated in the operating means low as well, a complex problem to be solved arises.

This problem is solved by a circuit arrangement having two frequency converters (=inverters) operating in different ways and having a completely different structure, even in a physical sense. The driving thereof in the sense of regulation/control is defined in form of a driving arrangement. Said driving arrangement comprises at least one regulating means. A comparable driving arrangement comprises two current regulators which are capable of driving and operating the circuit arrangement. A combination of the circuit arrangement and a driving arrangement is disclosed. An associated operating method concerned with the predetermination of switching frequencies is disclosed. An operating method for predetermining the switching frequencies of the two physically different branches is disclosed.

This overview is intended to show which subject matters are defined in the claims.

The distinction over the prior art resides to a lesser degree in the used switching concept of the converters, but rather in the employed power semiconductors and in the used switching frequency and thus also in a cooling procedure required for any frequency converter.

When a person skilled in the art speaks of a frequency converter, in brief converter, this converter comprises at least one, two or three phases which are each defined by a branch of at least two semiconductors. An inverter for three-phase machines which are used in most cases comprises three winding phases or three phases. Similarly, a transformer having three—or more—windings may be operated as an electrical operating means having magnetic action. The mention of two winding phases or three winding phases is not final, further winding phases may also be added, i.e. four and more winding phases, wherein each winding phase comprises a first branch and a second branch, each of said branches having a different threshold operating frequency.

In one embodiment, there is disclosed at least one first branch of a first frequency converter, which is not operable at more than 5 kHz and not adapted for this purpose, and a second branch of another frequency converter, which is operable and exactly adapted for operation above this frequency threshold, in particular, far above this threshold.

If a number of pairs of this one pair of branches of first/second branches is considered in combination, a multi-phase frequency converter is obtained, one being operable below said switching threshold only and one being operable above said frequency threshold.

The structure of at least one winding phase may be the minimum requirement for outputting a one-phase alternating current for a one-phase load, for example a one-phase machine, having a nominal frequency. The output alternating current is capable of fulfilling at least said nominal frequency.

Due to the driving, the actual frequency of the winding phase may also be below or above said nominal frequency, depending on the operating point of the machine. In most cases, the nominal frequency is below 400 Hz. It will not reach the threshold switching frequency of the first branch of the first frequency converter (will remain substantially lower) and will never reach that of the second branch of the other frequency converter. A factor of at least 10 is between the operating frequency (in the sense of the nominal frequency) and the upper threshold switching frequency of the first branch and the first converter, respectively. This also applies to assessing a lower threshold frequency of the slower switching branch to be predetermined, it necessary, preferably more than 500 Hz, in relation to an average switching frequency over one period of the fundamental wave of the main current.

The upper threshold frequency defines the physical structure and structural configuration of an actual inverter. A corresponding operating method, however, may show that these frequencies actually occur, especially during operation. In one embodiment, the actual proceedings in an electrically operated operating means having at least one winding and being, for example, a machine having preferably three windings in the stator and/or rotor.

If the operating method is based on the threshold frequencies, i.e. an upper threshold frequency of 5 kHz, which is not exceeded by the first branch (as a representative of a first frequency converter), and a higher switching frequency of the second branch (as a representative of the other frequency converter), said frequency thresholds are not of the kind occurring every time the inverters (frequency converters) operate. On the other hand, however, they define an upper threshold for the first branch—in the sense of a threshold frequency. There is no upper threshold predetermined for the second branch in the operating method, wherein the second branch is capable of switching at higher frequencies, but is not required to switch permanently at said higher frequencies. Thus, a plurality of frequencies occurs during operation— depending on the operating point and the load. In the first branch, said frequencies never exceed the first frequency threshold. In the second branch, they may be above, even far above, said first frequency threshold; however, also switching frequencies below said threshold may occur. In this connection, a very careful distinction should be made between actually occurring frequencies and functionally predetermined, claimed frequency thresholds in relation to the main alternating current and the supplementary alternating current which, when superimposed, together form the sum alternating current.

Supplementation of the one-phase consideration towards a two-phase consideration or towards a three-phase consideration is possible, whereby discrete inverters are defined, wherein the first branches of the one operating frequency are associated with the one inverter and the second branches of the other frequency are associated with the other non-identical inverter, respectively. In a three-winding phase arrangement, two discrete inverters for two different threshold operating frequencies are obtained which is the technical definition of the "non-identical" frequency converters. Accordingly, this also applies to the operating method.

If lower threshold frequencies are defined, for example, for the slower switching branch, it is useful to predetermine average frequencies, conveniently based on the fundamental wave of the main or sum current. This also applies to a lower threshold frequency of the faster switching branch.

Without modifying the internal structure of said two non-identical inverters (frequency converters), the output currents of the respective corresponding output terminals may be coupled to each other via a respective inductor, having a tap, outputting the sum current (the superimposed current) of the different operating frequencies of the two branches interconnected during parallel operation. The inductor prevents the currents of the one branch from flowing into the other branch, rather both currents of both branches are to be supplied, via the (magnetic) coupling, to the winding, for example of the motor, in which they are superimposed.

Two branches each, operating in parallel for forming a winding phase, sum the currents generated by them, on the one hand, the main alternating current of the low switching frequency converter and, on the other hand, the supplementary alternating current of the frequency converter operating at a higher frequency, so that the frequencies are superimposed in the sum current provided by a branch of the one frequency converter and a branch of the other frequency converter. The noise level is reduced. The thermal stress of the converter providing the main current is decreased.

In the winding of, for example, a connected machine, a sum alternating current having a ripple of high frequency is produced by driving the two branches provided by the second frequency converter. The machine is thus minimized with respect to its noise level and is capable of operating in a highly dynamic manner, wherein, on the other hand, the high load currents have to be switched at the lower switching frequency only so that a correspondingly lower power loss arises in this main frequency converter.

Interconnection of the different frequency converters, or at least one branch each of said two non-identical frequency converters, respectively, provides for superimposition of said different currents and enables superimposition of both alternating currents in the respective winding of the machine such that a parallel operation is obtained which is capable of combining low power loss with low noise development.

The two frequencies of the two branches of the two different frequency converters may differ considerably from each other, for example, may be above a factor of 2, in particular, in the range between seven-fold and nine-fold frequency of the "slowly" operating branch of the frequency converter. The thus operated operating means having a winding, or the suitability and design of the respective frequency converter for operating, for example, a machine is above 10 kW, in particular, above 30 kW, which functionally defines the size and rated power of the switching power semiconductors in the branches and the electrical devices associated therewith.

In other words, the definition of the design and operability of a respective branch of a frequency converter and of a frequency converter formed when multiplying the branches, e.g. three branches, is to be understood such that "design" refers to the components and the respective structure of the branches, i.e. suitable for current loading and for dissipating heat, and "operability" refers to the driving not implementing frequencies above or below said threshold.

By this, a person skilled in the art understands a specific kind of frequency converters, on the one hand, the kind which is incapable of operating at pulse frequencies of more than 5 kHz and which is adapted for generating an alternating current high in effective value, which accepts the substantial load portions of, for example, the motor above 10 kW. On the other hand, the second frequency converter is designed for operation at a substantially higher frequency and is adapted for accepting no more than lower load fractions by providing the supplementary alternating current.

The relationship of said two loads and the load distribution is within a range of more than 5, in particular, more than 10, as measured by the respective effective values of the output currents. In an example, it may be said that the inverter operating at a low frequency provides currents of up to 200 A and the supplementary alternating current is in an order of magnitude of 20 A to 30 A.

A more precise distinction of the two branches, the first branch for the lower frequency and the second branch for the higher frequency, and the two inverters or converters having multiple first branches and multiple second branches, respectively, may also be provided.

The highest threshold frequency of the slower switching frequency converter may also be brought down to smaller upper frequency thresholds, such as 4 kHz down to a maximum of 2 kHz. The first branch is then more limited in its switching frequency. Accordingly, the second branch is then able to switch at even higher frequencies of more than 5 kHz up to 16 kHz. Due to the combination of the first and second branches, all combinations mentioned herein are to be considered as disclosed, i.e., for example, not more than 4 kHz for the first branch and more than 15 kHz for the second branch.

In a relationship of frequencies of a factor of 4, i.e. 4 kHz and 16 kHz, an integer multiple is obtained which may also be extended to other factors. All of which again with the proviso that the defined circuit arrangement is of the kind having the design and ability to operate at said frequencies (second branch) or which is not operable above the said smaller frequencies.

In a further specific embodiment, the factor of the said frequency is substantially a factor of 2.

Interconnection of the two branches (phases of the one and the other frequency converters) is implemented by means of a, in particular, centrally tapped inductor. A "winding phase" in the claimed sense is created, which is able to replace an output phase of a normal converter by means of the advantages of the invention. The inductor may be configured as a double winding applied to a common core, which decouples the two switching outputs of the first and second branches from each other and which collectively supplies the two output currents of said two branches to the motor winding. The motor winding for alternating current machines is represented by a leakage inductance and a main inductance in alternating current machines.

The current ripple generated by the "slow" frequency converter, which current ripple has the low frequency and is thus relatively large and distinct, is compensated by the supplementary alternating current. Only the current ripple having the high frequency still occurs in the motor. Supplementation is implemented such that an at least smoother profile of the actual value of the output current is obtained, wherein compensation does not have to be complete, but may be implemented in substantial parts. The current ripple (the alternating portion on the fundamental wave of the output alternating current) indicates the harmonic wave portion effective in the machine, wherein the lower harmonic waves of the main alternating current no longer occur therein.

For driving the first and second branches, at least one current regulator is used. A driving arrangement is created. However, operation without a current regulator is also possible so that a generated current ripple of the slower inverter (having the lower frequency) is compensated by an adapted pulse pattern of the second branch (of the inverter having the higher frequency) or is at least compensated to a large extent.

In the at least one, preferable two current regulators provided for two branches forming a winding phase, driving is provided such that compensation of the low-frequency current ripple is predetermined by the regulator side. The regulating difference, which the main load current still has, as compared to the reference variable in form of its nominal current value, is connected to the regulator of the faster switching branch as a nominal value. The current regulator thus only receives a regulating difference of the first current regulator, which regulating difference cannot be compensated by this first regulator due to the inherent limitation of the switching frequency of the first branch.

Both current regulators remain discrete, wherein each one of which regulates its actuator in form of the first branch and the second branch. Each one of the regulators has its own nominal value, which are not identical in signal.

In a regulator for three winding phases, specific ones of said regulators may be combined. In field orientation, a current regulator may be provided which drives the individual phase currents, at least the main load current, after a transformation from vector space.

When controlling the current of the two branches, it is not the output current which is measured, i.e. not the sum current of both branches, but the current prior to the combination of the individual currents of the branches.

An inductor wound in the same direction comprising two winding portions which are applied to a core in the same sense of winding, has an input for the load current generated at the low frequency and an input for the supplementary load current generated at the higher frequency. An electrically conductive connection of the other ends of the two windings forms an output for the superimposed current which is output as a sum current from the winding phase.

The preferably centrally tapped inductor connected in this way and having a tap ensures that the two branches of a respective winding phase do not substantially interfere with each other in internal measure.

The overall size of the inductor is not critical. The inductor is purpose-oriented and capable of letting the height of the main output current of the winding phase pass while allowing for hardly any or only very low losses. Since the currents in the two windings of the two non-identical branches differ considerably in height, the windings may be adapted in cross-section which is, however, not required.

A cross-section of the winding adapted to the main current may be selected, which winding is then centrally tapped to define the output terminal of the winding phase, the same applies to the driving arrangement.

The regulators of the circuit/driving arrangement may be realized analogously, digitally or by way of programming.

BRIEF DESCRIPTIONS OF THE FIGURES

Exemplary embodiments explain and supplement the claimed invention. Application of the invention in electrically operated operating means having at least one winding (for magnetic action) is implemented, by way of example, in a motor.

FIG. 2 may be interpreted in three ways if the regulation is performed in field coordinates.

FIG. 6a,

FIG. 7a,

DETAILED DESCRIPTION OF THE INVENTION

Figure 1:
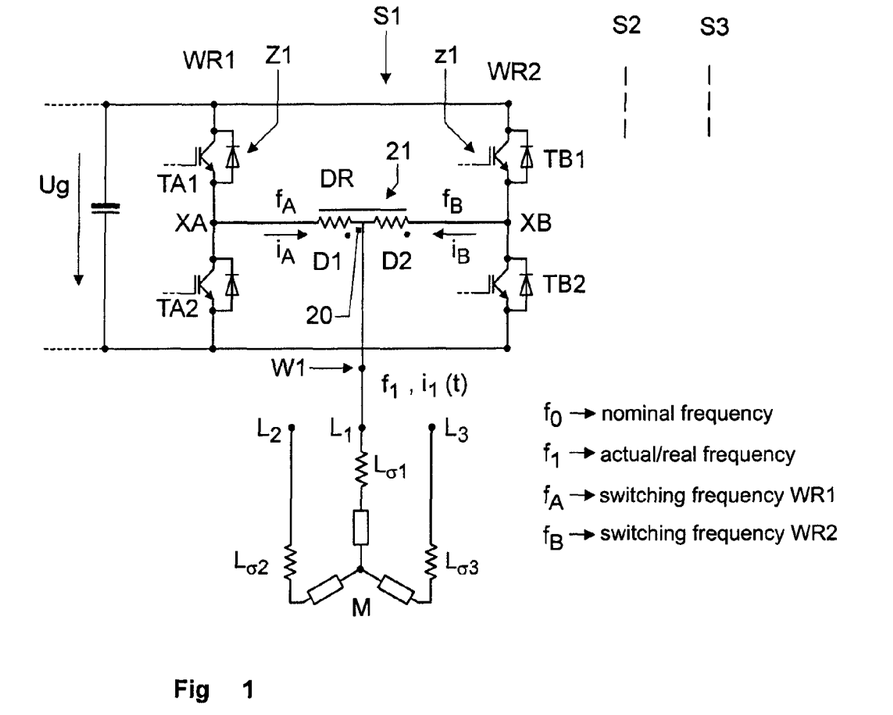
FIG. 1 shows a winding phase S1 illustrating a first branch Z1 of a first inverter WR1 and a first branch z1 of a second inverter WR2 including the associated switching elements The machine (e.g. a motor) to be supplied and having three windings is also illustrated, wherein the two shown branches Z1, z1 define the first winding phase S1 and feed the first winding L1 of the machine M. The two other winding phases S2, S3 are not shown but are configured accordingly, which other winding phases feed the other two windings L2, L3 of, for example, the motor M. Also in this case, respective first and second branches are provided.
Figure 5:
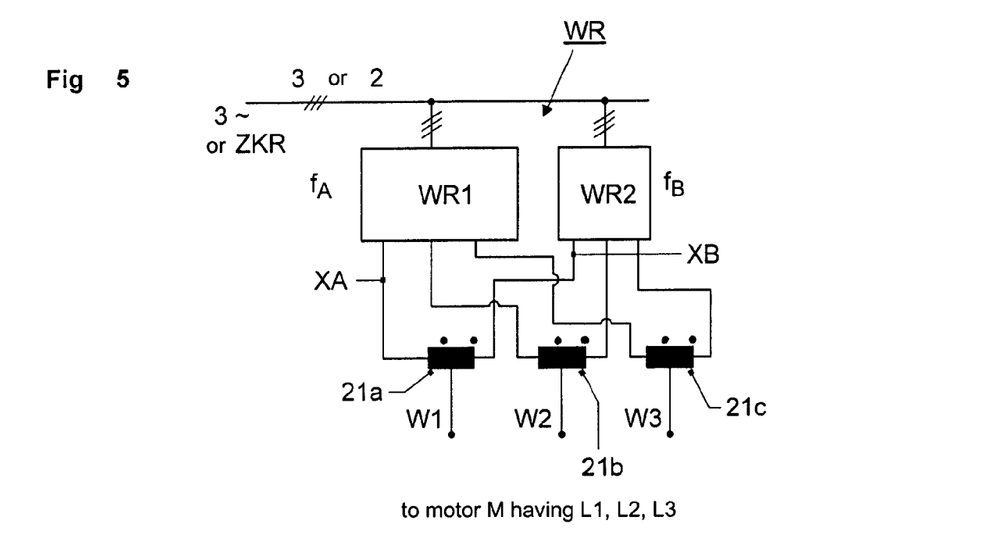
FIG. 5 shows a simplified diagram including two inverters, one inverter WR1 for a high current at a low switching frequency and a second inverter WR2 for a lower current at a higher switching frequency, wherein the output currents of the three inverters each having three phases are superimposed in phase via one respective inductor 21a, 21b, 21c and which output currents are available at three output terminals W1, W2 and W3 in order to be able to be supplied to a motor having a corresponding number of windings L1, L2, L3 (or to the respective input terminals of said windings) or alternatively to a transformer.

A synopsis of FIG. 5 and FIG. 1 gives an overview over the organization of the pulse inverters and the driving method, by means of which the symbolically illustrated machine M, in the embodiment a motor in form of a highly dynamic servo motor, is fed.

The machine is to be understood in the sense of a motor or generator and comprises three windings, which are either represented by windings L1, L2 and L3 or by the terminals (input terminals) thereof in the example illustrated in FIG. 1. Each winding symbolically has inductance and resistance. The motor M is connected, for example, in star.

A respective winding is supplied with a current $i_1$ (t). The shown circuit arrangement of two inverters, i.e. an inverter for higher current values and with main power transmission, such as inverter WR1 shown in FIG. 5, and a second inverter WR2 for lower current values, but having a higher switching frequency, is to be described in such a way that initially an overview is given by means of FIG. 5 and then only one branch of each one of the two inverters, which are interconnected in FIG. 1, is explained.

Branch Z1 is associated with inverter WR1 and branch z1 is associated with inverter WR2. Their output terminals XA and XB, respectively, are interconnected via an inductor 21, also referred to as DR, and the flowing current is superimposed, wherein said inductor comprises a centre tap 20. The winding is wound onto the same core in the same direction such that a degenerative feedback is created and the current from the first branch Z1 will not flow into the second branch z1 and vice versa. The superimposed current $i_1$(t) flows from the centre tap 20 to the output terminal W1 and is supplied to the motor at the first winding L1.

Accordingly, the same applies to circuit arrangements S2, S3 and the branches of the two inverters WR1 and WR2 thereof according to FIG. 5, which circuit arrangements are, however, not illustrated separately herein, but are to be appreciated accordingly by a person skilled in the art.

The two inverters WR1 and WR2 may either be feed via an intermediate circuit ZRK or are connected to an alternating current network, wherein the alternative of a common intermediate circuit having the voltage Ug is preferred.

The three inductors 21a, 21b und 21c of the three winding phases of FIG. 5 correspond to inductor 21 of FIG. 1 so that only this inductor DR or 21 is mentioned in the following when explaining winding phase S1.

The inverter (for example, frequency converters or other converters switching at a higher frequency), which is composed of the two inverters WR1 and WR2 and which is "viewed" by a user from the terminal side W1, W2, W3, feeds the motor M. The one inverter WR1 is operated at a low switching frequency, e.g. at 2 kHz, and provides the main power transmission to the connected motor M. The second inverter WR2 is operated at a higher switching frequency, e.g. at 16 kHz, and ensures that the current ripple of 2 kHz left by the first inverter is compensated and that only a current ripple of a higher frequency, for example, 16 kHz, occurs in the motor.

The second inverter WR2 has a further function. This function is the highly dynamic current regulation which cannot be implemented by the first inverter WR1 due to its low switching frequency of less than 5 kHz, e.g. even less than 2 kHz. Dynamic current regulation is accomplished by the speed of the current ripples of a generator frequency of more than 5 kHz, e.g. more than 10 kHz, up to frequencies of more than 15 kHz.

The two branches Z1 and z1 of a respective one of the two said non-identical inverters switching in different frequency ranges are connected to each other via inductor 21 (or DR), wherein a centre tap 20 of the inductor 21 defines the output terminal W1 (the "terminal") of a winding phase S1 of the total inverter WR which is formed by the two inverters according to FIG. 5. The two branches according to FIG. 1 are connected to a winding L1 of the motor via this inductor. In this constellation, only low switching losses occur at up to 2 kHz in the high switching alternations for power transmission. On the other hand, switching losses do occur at the high switching frequency of more than 5 kHz, however, they will not become large due to the small required supplementary current of this branch z1 and the inverter WR2, respectively, as shown by the component currents of FIG. 3 (bottom) or the sum current according to FIG. 4.

Figure 2:
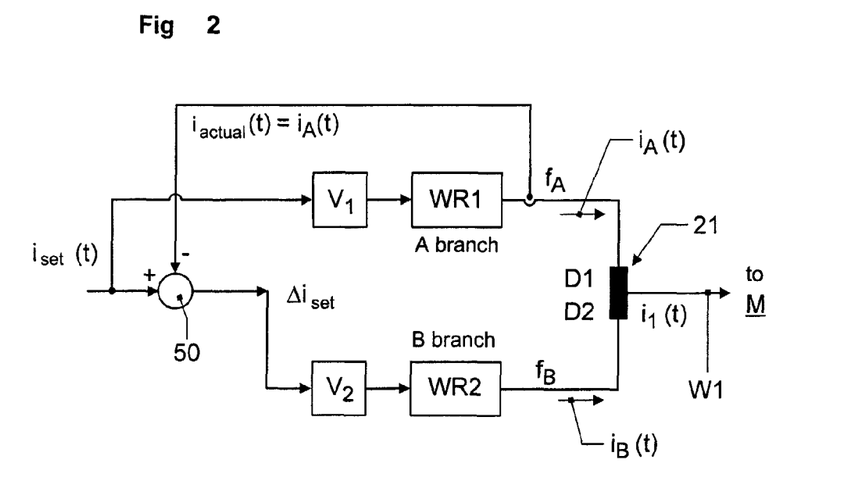
FIG. 2 shows a controlling circuit arrangement which regulates the current in the two branches Z1, z1 of FIG. 1. A winding phase or a respective branch of two non-identical inverters WR1, WR2, an output inductor 21 and the output current at the output terminal W1 leading to the motor M are shown.

Current control of this highly dynamic regulating arrangement of the two said inverters of FIG. 5 is implemented in accordance with FIG. 2, in which only one winding phase and its current regulation, respectively, is illustrated for the sake of simplicity of explanation. The connecting element is the inductor 21 with its two windings D1, D2 and its output W1. The explanation of winding phase S1 is to be transferred to the other winding phases S2, S3 (or further winding phases).

The highly dynamic regulation of the motor current is implemented by predetermining a nominal value of the current $i_{nominal}$(t) which is predetermined for the first current regulator V1 in FIG. 2. Said regulator controls the first inverter WR1, at least one of its first branches, one of which is illustrated in FIG. 1 under Z1. This branch is also referred to as A-branch due to the switching frequency $f_A$ which is less than 5 kHz, in specific applications less than a maximum of 3 kHz, and which may be especially in the range of a maximum of 2 kHz. Due to this frequency limitation, the first current regulator is incapable of tracking the nominal current value such that the actual value is readjusted in a highly dynamic manner. As a result, a current measurement, measuring the actual value in form of current $i_A(t)$, shows a distinct regulating error which is illustrated by the shaded portion in FIG. 3, top illustration. This regulating difference is determined by subtraction 50 of the actually measured current $i_A(t)$ having the low switching frequency and the very precisely predetermined nominal value $i_{nominal}(t)$, which difference defines a second nominal value $\Delta i_{nominal}(t)$ which is predetermined for the second current regulator V2 of the second inverter providing the supplementary alternating current $i_B(t)$ and also feeding the inductor 21.

Interconnection and superimposition, respectively, of said currents in the inductor 21 causes the regulator V1 to control and accept the main load, wherein regulation thereof is inaccurate, and causes the second regulator V2 to contribute the supplementary load thus ensuring accuracy of the sum current $i_1(t)$.

Both current regulators may be configured as usual, are shown symbolically as V1, V2 and, in most cases, also comprise integral portions for setting the regulating difference to zero in the stationary state. Each current regulator or each inverter is per se degenerated. Each current regulator implements regulation "discretely". A corresponding control loop of currents $i_A$ and $i_B$ is provided for each branch (first and second) or for each inverter WR1, WR2, but is not shown graphically in FIG. 2. It corresponds to a current regulator common in drive technology which does not have to be explained separately to a person skilled in the art.

It has already been mentioned, but shall be emphasized again, that the two frequencies $f_A$ and $f_B$ of the two inverter branches Z1 and z1 are not identical, in particular, differ considerably from each other and are above or below a threshold of 5 kHz according to a simple definition.

Preferred embodiments of distinct variations are above 10 kHz for the inverter WR2 switching at a higher frequency and at most 4 or 3 kHz for the inverter switching at a lower frequency; however, the deviations may be further increased so that the inverter switching at a high frequency is above 10 kHz, in particular, above 15 kHz, whereas the inverter switching at a low frequency is operable at most in a range of 2 kHz and is configured accordingly.

Figure 3:
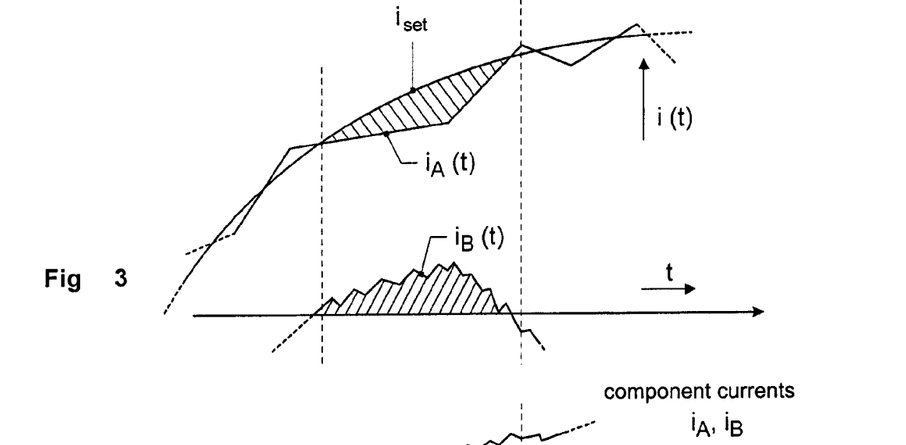
FIG. 3 schematically illustrates a section of the two currents of the two individual branches Z1, z1 for superimposing these currents in inductor DR/21 to form a sum current.

The result of FIG. 3 shows a section of a sinusoidally increasing nominal current $i_{nominal}(t)$, a main load current $i_A(t)$ switched at the low frequency and having a corresponding regulating difference as shown by the shaded portion. The second component current, which is added by the regulation according to FIG. 2 and the nominal value routing $\Delta i_{nominal}(t)$ shown therein, provides for compensation of the high regulating deviation and reaches a sum current $i_1(t)$ as may be output at the centre tap 20 of the inductor DR/21 or 21a for the one winding of the motor M. This "sum current" according to FIG. 4 (the superimposed current) is the actual output current of this first winding phase S1 comprising two branches Z1, z1 and the associated regulation according to FIG. 2. It is "viewed" by a load at terminal W1. Interconnection of the inverters WR1/WR2 appears to be a powerful inverter having a high switching frequency and low cooling requirements even though it is capable of operating in a highly dynamic manner with regard to current regulation.

The described interconnection is able to operate in such a way that two commercially available inverters may be used together and are correspondingly connected and supplemented, respectively, via inductors 21a, 21b, 21c regarding their nominal value routing and their output terminals.

It is thus not necessary to design and construct new inverters, rather existing inverters may be employed, adapted accordingly and modified according to the embodiments described herein.

A more detailed description of a branch of an inverter may be dispensed with here since it may be referred to the general state of the art known to a person skilled in the art. It shall be outlined in brief that a branch of the first inverter WR1 comprises a top switching transistor TA1, a bottom switching transistor TA2 and respective relief diodes in FIG. 1. The connection of the top emitter and the bottom collector is the output XA of the first branch Z1 outputting a current modulated by switching frequency $f_A$, which switching frequency is less than 5 kHz. The fundamental frequency of this current $i_A(t)$ is clearly below this switching frequency, which current corresponds to the operating current of the machine M, which may be in an order of magnitude of up to 50 kHz, or up to 400 Hz in dynamic actuating procedures, but in any case differs so distinctly from the upper frequency threshold $f_A$ that this frequency $f_A$ is in any case capable of readjusting the operating current to the operating frequency of the motor at least in approximation, as shown in the example of FIG. 3 (top diagram).

The second branch z1 of the non-identical other inverter is connected accordingly, only with other types of power semiconductors TB1, TB2, which are capable of outputting a supplementary current $i_B(t)$ at a switching frequency $f_B$, the ripple of which corresponds, in order of magnitude, to the operating frequency of this branch of this inverter.

A distinction should be drawn between the nominal frequency $f_0$ of the machine M or a transformer and the actual frequency $f_1$ of the machine or transformer, which the respectively supplied sum current $i_A(t)$ has as a fundamental wave. This actual frequency is a function of load and operation, the nominal frequency of the machine is predetermined. The actual frequency $f_1$ may be above or below the nominal frequency of the machine, however, it will not reach the range of the maximum switching frequency $f_A$ of the first inverter (switching at a lower frequency) and much less the range of the switching frequencies $f_B$ of the second inverter (switching at a higher frequency). Thus, the frequency ranges used for explanation herein, which are sometimes also referred to as higher or lower and larger and smaller and for which also the technical term "substantially higher" frequency is used, are defined and rendered clear and comprehensible for a person skilled in the art.

When starting from a description of an inverter which is operable and adapted for operation at switching frequencies of not higher than an upper threshold frequency, for example 5 kHz or 4 kHz or in a range of 2 kHz with respect to the inverter WR1 and the branch Z1 associated therewith, respectively, this is a way of expressing in professional terms that the power semiconductors are selected for such a switching frequency and that the driving is adapted and configured such that this switching frequency is not exceeded. A person skilled in the art may learn the specific design and precise structure of such an inverter from said functional data. For such an inverter, of course, also power semiconductors may be used which are capable of switching higher frequencies, it is only that such an inverter would be correspondingly higher in cost and its cooling requirement would be higher. From an expert's point view, an inverter is chosen which is low in cost and equipped with semiconductors just capable of switching a threshold frequency and a driving is chosen which is adapted thereto and operable with two regulators and the internal pulse patterns of WR1, WR2, as depicted symbolically in FIG. 2.

The A-branch, which is associated with branch Z1 of FIG. 1, is adapted for this low switching frequency which is, however, still considerably higher than the nominal frequency of the machine M to be connected thereto and which is also considerably higher than the actual frequency of the supplied alternating currents sometimes required for operation of this machine, for example, in highly dynamic control operations or in machine tools or other highly dynamic current regulations and applications requiring fast regulating operations. Such applications comprise, e.g. a cross cutter (synchronized to a web speed) or printing machines (synchronized to a printer's imprint).

The alternative feeding of the two inverters WR1, WR2, shown in FIG. 5, either via a multi-phase alternating system (e.g. a three-phase network) or a common intermediate circuit, is illustrated in FIG. 1 for the example of the intermediate circuit having the intermediate circuit voltage Ug, wherein all branches of these inverters are feed by this intermediate circuit which may be common to both inverters WR1, WR2.

FIG. 1 shows the first branch of the first inverter WR1 and a branch of the second inverter WR2 corresponding to this phase of the alternating system to be produced, in the example, the one which is supplied to the motor winding L1, L2, L3 are fed accordingly.

Here, the concept of "phase" is to be understood such that there is a branch which defines an individual unit in the load part of the inverter and which, together with another branch of the second inverter, defines a winding phase S1 which appears to be a new inverter, when viewed from output terminal W1. This winding phase then feeds the first winding of the rotor or stator of the machine M. A phase is then analogously the alternating voltage output to W1 or the output alternating current having the actual frequency $f_1$, which phase is combined to form a three-phase system when three correspondingly configured phases are provided. In order to avoid confusion with this "phase", the two branches of FIG. 1 operating in parallel operation and associated with non-identical frequency converters are referred to as winding phase. They are referred to as first winding phase S1, which is also associated with the control and driving, respectively, according to FIG. 2 for implementing the current regulation of the two alternating currents output by the two branches z1, Z1 and for superimposing said currents in the interconnected inductor DR.

Figure 4:
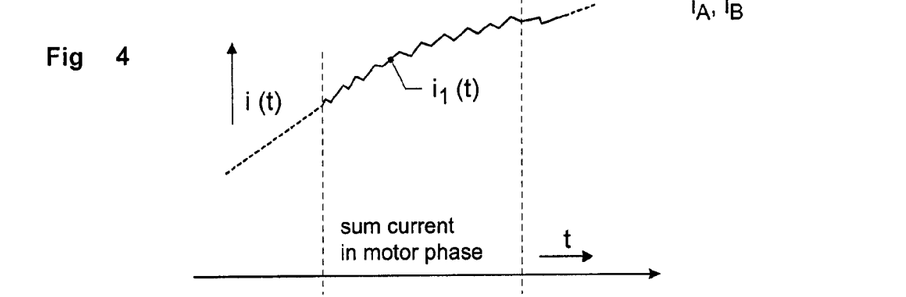
FIG. 4 illustrates the superimposed sum current $i_1$ (t) resulting from the two partial currents of FIG. 3, i.e. the main alternating current and the supplementary alternating current.

It may be learned from the function of the two component currents 1A and 1B of FIG. 3 that the current portion of higher frequency, which is the supplementary current, is able to compensate the generated current ripple of the first component current corresponding to the main alternating current. This compensation does not have to be complete, but may essentially result in obtaining a smoother profile of the actual value of the alternating current being as close to the nominal value $i_{nominal}(t)$ as possible so that a sum current according to FIG. 4 is obtained which is also referred to as superimposed current.

The only ripple viewed by the motor and the correspondingly highly attenuated noise are obtained with a lesser effort than if a main converter of the power category of the motor was chosen which is capable of switching the high switching frequency, i.e. is required to meet both power limitations, the nominal current of the motor and the high switching frequency required for low noise and high dynamics.

This comparison shows that the weight and cost of two smaller converters are, in sum, more favorable than the weight and cost of a large converter having both threshold values in current and switching frequency. In addition, when combining two non-identical inverters, savings may be achieved, which manifest themselves by only one control electronics unit, only one network supply unit and a common housing. It may further be contemplated that optimization potentials may be exploited by a purposeful adaptation of the power part of the inverter WR1 (having the low switching frequency). Here, low-cost power semiconductors may be purposefully employed for achieving notable cost and weight advantages, while causing neither a deteriorated noise behavior nor losses in regulating dynamics.

Figure 6A:
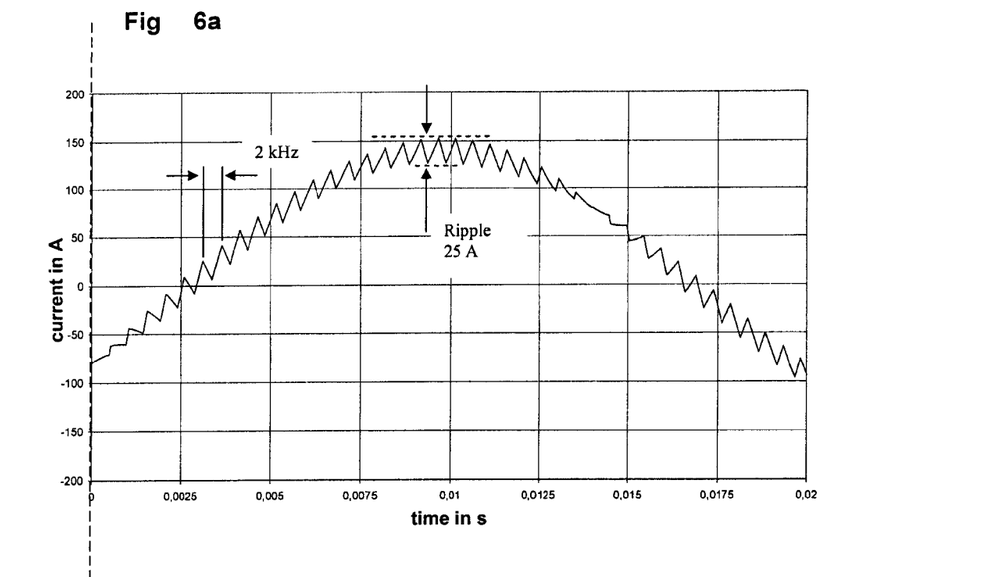
Figure 6B:
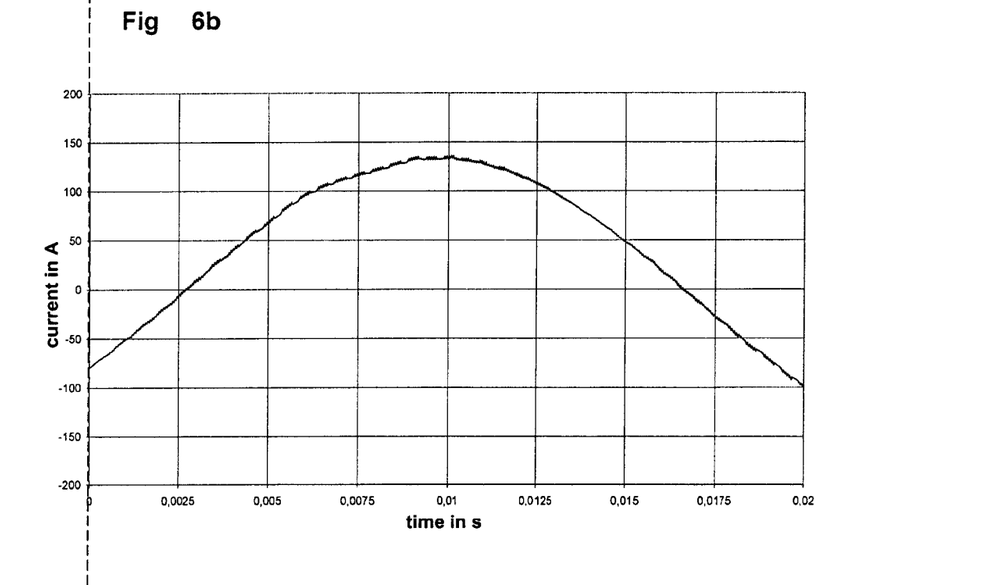
FIG. 6b each show 20 ms of an entire period of current $i_A$ of FIG. 3 and of superimposed current $i_1$(t) of FIG. 4 accurate in time and one below the other.

FIG. 6a shows an entire period of the current profile symbolized in a short section only in FIG. 3. It is the current $i_A(t)$, which is generated when switched at the low frequency of the first inverter WR1 and the first branch Z1, respectively. A relatively large current ripple of up to 25 A can be seen at a maximum switching frequency of approx. 2 kHz, which corresponds to one of the above described embodiments. The specific values of the current profile are such that a machine having a nominal power of 55 kW is operated at a nominal current of 100 A. The frequency of the fundamental wave is in an order of magnitude of 35 Hz. The maximum switching frequency of the high-power inverter WR1 may be readily recognized. If a high-frequency alternating current $i_B(t)$ having a switching frequency of 16 kHz is superimposed, the profile of FIG. 6b is obtained as the sum output current of one winding phase (for one terminal of the machine M) Current ripples of low frequency can no longer be recognized; they are compensated by the regulation according to FIG. 2 at the high-frequency switching frequency of the second inverter WR2 and the second branch Z1, respectively, the current of which is superimposed on the main sum current of FIG. 6a by means of the inductor 21.

Figure 7A:
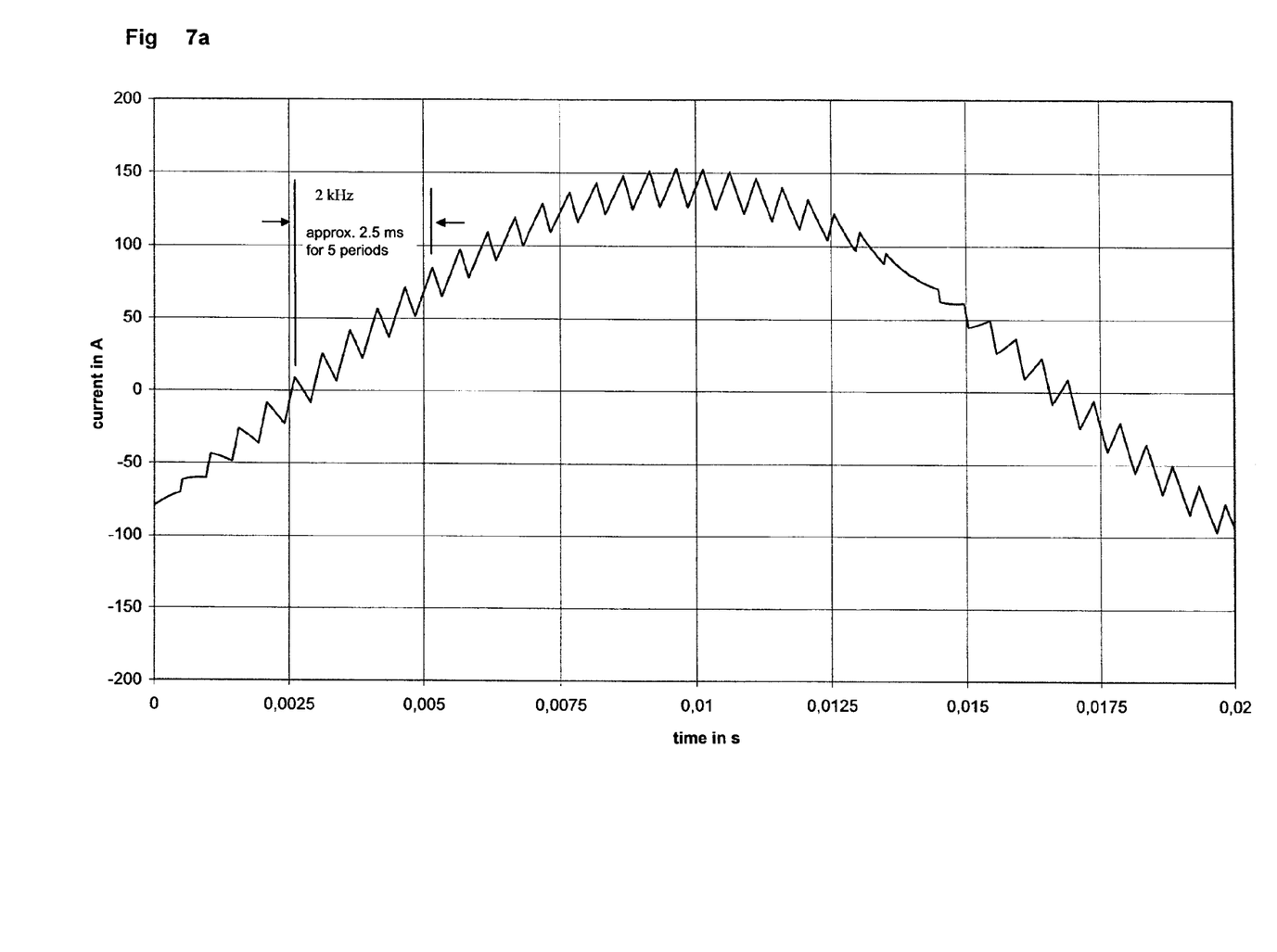
Figure 7B:
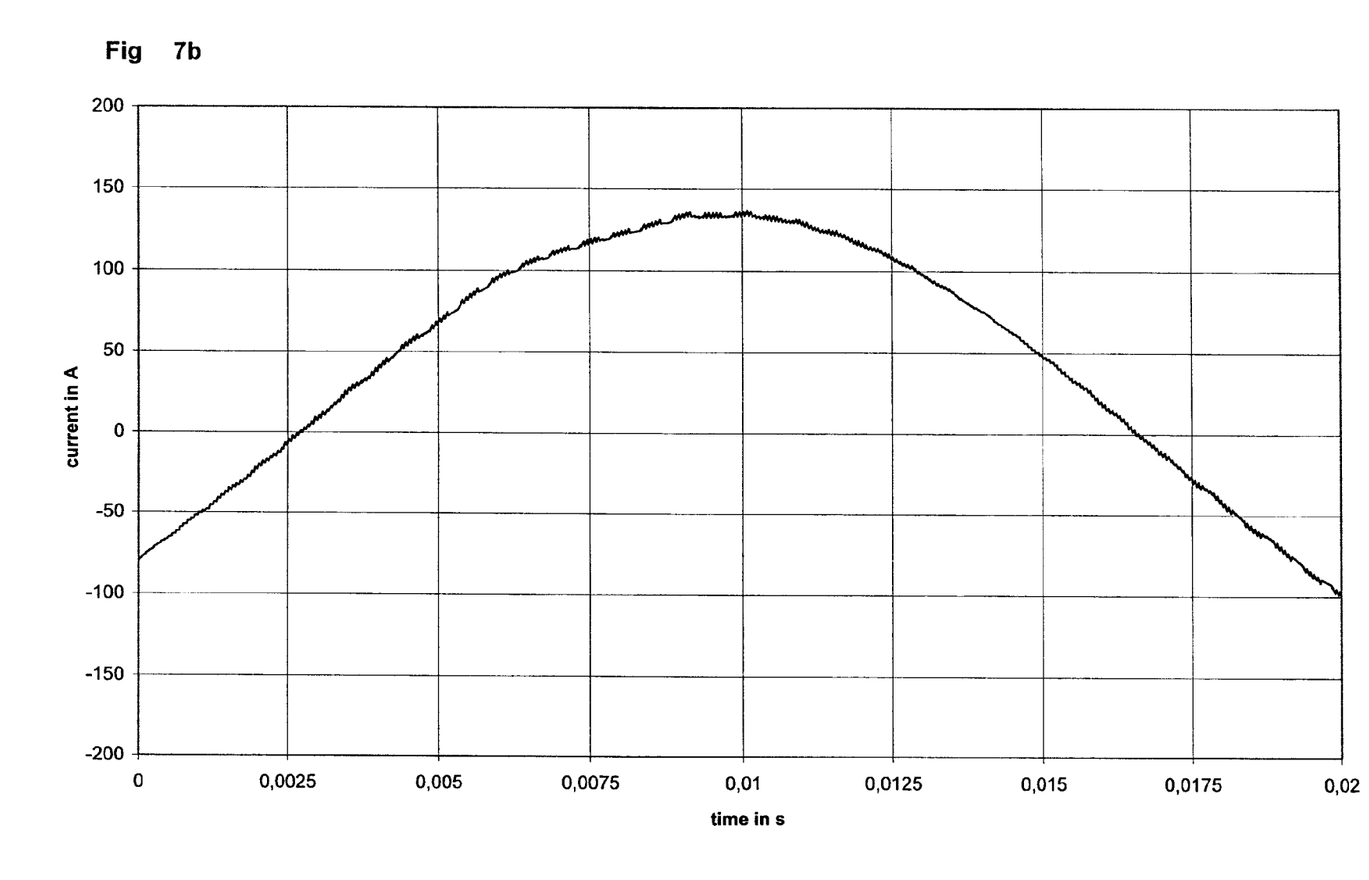
FIG. 7b are respective magnified diagrams of the two currents of previous FIGS. 6a, 6b.

FIG. 7a shows a magnified view of FIG. 6a, in which the time base is shown enlarged. FIG. 7a shows an enlarged section of FIG. 6a illustrating five periods between points of time 2.5 ms and 5 ms. A frequency of the first branch Z1 of inverter WR1 of approx. 2 kHz may be calculated therefrom. If the currents of the second inverter WR2 switching at a higher frequency and of its branch z1 are added and if they are supplied to the winding L1 together, the smoothed current according to FIG. 6b is obtained in the enlarged section according to FIG. 7b. This current comprises only small ripples as can be seen, in particular, when comparing point of time 10 ms to FIG. 7a. The vertical axes are numbered identically in all of FIGS. 6a to 7b, wherein FIGS. 6a, 7a illustrate current 1A and FIGS. 6b, 7b illustrate current $i_1(t)$.

The power flow at the output of the two branches z1 and Z1 is dependent upon the adjustment of inverter WR1 (A-branch). If WR1 is adjusted such that it provides a current never exceeding the nominal value of the current, a current flows in WR2 which always raises the total current as compared to the current of WR1 so that the nominal value is achieved, wherein no current is fed back from WR1.

The situation is different if the current of WR1 varies about the nominal value and is thus temporarily higher than the nominal value, as shown by the ripple of FIG. 7a. In this case, current and power are temporarily fed back to WR2. The mean value of power is approx. zero, since power is temporarily output and temporarily input.

If WR1 is adjusted such that it always provides a too large current, even with the ripple, WR2 will always act against that and take in power.

Since the two inverters are preferably operated with a common direct-voltage intermediate circuit Ug according to FIG. 1, a possibly input power of a branch or inverter is again provided to the other branch or inverter via the intermediate circuit and thus output to load. This input power is thus not lost, but is only lead in a circle once (compensated by the intermediate circuit).

In another embodiment, it is not necessary to provide for dynamic speed control or dynamic momentum control. The second inverter WR2 is then driven in synchronization with the first inverter WR1. An appropriate pulse pattern may provide for elimination of the current ripples having the lower pulse frequency in the motor.

However, a highly dynamic regulation of the current by means of a current regulation which is configured as explained in FIG. 2 is preferred. The pulse pattern is obtained automatically in the second inverter WR2. Filling the ripple according to FIG. 3 (top function) is achieved by means of the circuit and signal routing.

In current regulators, the error caused by feeding the first inverter WR1 is predetermined as a nominal value for the second inverter and compensated by the second inverter by the higher-frequency driving in the actuator, wherein the more dynamic current in form of the second current component $i_B(t)$ is compensated at best completely or at least substantially.

The invention claimed is:

1. A circuit arrangement for feeding a magnetically active and electrically operable operating means having a winding, the circuit arrangement, in at least one first phase, comprises:
   (a) a first branch of a frequency converter adapted for and operable at a first switching frequency of not higher than 5 kHz for outputting a main alternating current generated at said first switching frequency and having a substantially lower operating frequency to the winding of the magnetically active and electrically operable operating means;
   (b) a second branch of another frequency converter adapted for and operable at a second switching frequency of more than 5 kHz for outputting a supplementary alternating current generated at said second switching frequency to the winding;
   wherein, in the winding of the operating means, the two alternating currents of the first and second branches are superimposed to form a sum current during parallel operation of the first and second branches of the two non-identical converters for at least the first winding phase of the circuit arrangement.

2. The circuit arrangement according to claim 1a, wherein at least one further phase of the circuit arrangement according to claim 1 configured to feed a second winding of the electrical operating means.

3. The circuit arrangement according to claim 2, wherein a winding phase of the circuit arrangement composed of two branches of non-identical converters is provided for feeding a third winding of the electrical operating means, in particular, the machine, with a third superimposed alternating current.

4. The circuit arrangement according to claim 2, wherein the first branch comprises three first branches being associated with a first three phase frequency converter configured to operate below no more than 5 kHz and a driving circuit thereof configured for operation below that frequency only.

5. The circuit arrangement according to claim 2, wherein three second branches are provided and are associated with a second three phase frequency converter configured for operation above 5 kHz and a driving circuit thereof configured for operation above the same frequency threshold.

6. The circuit arrangement according to claim 1, wherein the first and second branches each comprise at least two switching power semiconductors that are connected in series is fed by an intermediate circuit for outputting the alternating current, which may be generated by the switching, at their junction.

7. The circuit arrangement according to claim 1, wherein, in the phase, each branch operates via a respective associated output winding of an inductor associated with the phase on the respective winding of the operating means.

8. The circuit arrangement according to claim 1, wherein the switching frequencies of the two branches differ from each other by more than a factor of 2.

9. The circuit arrangement according to claim 8, wherein the switching frequencies have a relationship of $2^n$, wherein "n" is an integer greater than one.

10. The circuit arrangement according to claim 8, wherein the switching frequencies of the two branches differ from each other by a factor between 7 and 9.

11. The circuit arrangement according to claim 1, wherein the magnetically active and electrically operable operating means is an electrically operated machine driven by the circuit arrangement has a nominal power of more than 10 kW, or wherein the circuit arrangement is configured to operate the machine at a nominal power of more than 10 kW.

12. The circuit arrangement according to claim 11, wherein the nominal power is greater than 30 kW.

13. The circuit arrangement according to claim 1, wherein the first branch is not operable above an upper frequency limit of 4 kHz.

14. The circuit of claim 13, wherein the upper frequency limit is 3 kHz.

15. The circuit of claim 13, wherein the upper frequency limit is 2 kHz.

16. The circuit arrangement according to claim 1, wherein the second branch is operable above a lower frequency limit of 10 kHz.

17. The circuit of claim 16, wherein the lower frequency limit is one of 15 kHz and 16 kHz.

18. The circuit arrangement according to claim 1, wherein the second branch operable at the second switching frequency is configured for supplementing a ripple generated in a current of the first branch configured to operate at the first switching frequency to form a sum current output an actual value of the alternating current with a smoother profile.

19. The circuit arrangement according to claim 18, wherein the sum current output comprises an effective current ripple in the range of the frequency of the branch operating at the second switching frequency.

20. The circuit arrangement according to claim 1, wherein a pulse pattern for driving the second branch is adjusted such that a generated current ripple of current output by the first branch is substantially compensated for.

21. The circuit arrangement according to claim 1, wherein the switching frequencies of the two branches differ from each other substantially by a factor of 2.

22. The circuit arrangement according to claim 1, wherein an inductor comprises two windings magnetically coupled in the same direction and connected to each other in an electrically conducting manner for superimposing the main and supplementary alternating currents so that the sum current can be output as a superimposed current at the junction of the magnetically coupled windings.

23. The circuit arrangement according to claim 1, wherein the main and supplementary alternating currents are fed to an inductor having a tap outputting a sum current for the winding of the operating means.

24. The circuit arrangement of claim 1, the operating means being an electrically operated machine having at least one rotor or stator winding.

25. A method for operating a circuit arrangement for feeding an electrically operated operating means having at least one winding the circuit arrangement, in at least one first phase comprising:
- (a) a first branch of a frequency converter adapted for and operable at switching frequencies of not higher than 5 kHz, wherein a main alternating current generated at said switching frequencies is output to the at least one winding;
- (b) a second branch of another frequency converter operable at other switching frequencies of more than 5 kHz, a supplementary alternating current generated at said other switching frequencies is output to the same winding;
- wherein, in the at least one winding of the electrically operated operating means, the two alternating currents of the two branches are superimposed during parallel operation of the first and second branches of the two non-identical frequency converters for at least the first phase of the circuit arrangement.

26. The method according to claim 25, wherein a lower threshold frequency of the first branch, on average over a full 360° interval of the main alternating current is ten times greater than the nominal frequency of the main alternating current.

27. The method according to claim 25, wherein the lower switching frequency of the second branch, on average over a full 360° interval of the main alternating current, is above 10 kHz.

28. The method of claim 25, the operating means being a machine having at least one rotor or stator winding.

29. A circuit arrangement for feeding a magnetically active and electrically operable operating means having a winding and including a driving arrangement, the circuit arrangement, in at least one first phase, comprises:
- (a) a first branch of a first frequency converter operable at first switching frequencies of not higher than 5 kHz for outputting a main alternating current generated at said first switching frequencies and having a substantially lower operating frequency to the winding of the magnetically active operating means;
- (b) a second branch of a second frequency converter adapted for and operable at higher switching frequencies of more than 5 kHz for outputting a supplementary alternating current generated at said higher switching frequencies to the same winding;
- for superimposing, in the winding of the operating means, the two alternating currents to form a sum current during parallel operation of the first and second branches of the two non-identical first and second frequency converters for at least the first phase of the circuit arrangement,
- and wherein said driving arrangement comprises:
- (c) at least one first current regulator for the supplementary alternating current for regulating or controlling the sum current in the first phase and wherein the first current regulator is provided with a difference between a set current value of the first phase and a measured current of an output of the first branch.

30. The circuit arrangement according to claim 29, wherein at least one further phase is configured to feed a second winding of the electrical operating means.

31. The circuit arrangement according to claim 29, configured to drive an electrically operated machine having at least one rotor or stator winding.

32. The circuit arrangement according to claim 29, wherein a further regulator is provided for the main alternating current and
- the further regulator for controlling the main alternating current generated at the first switching frequencies is supplied with the set current value of the winding phase so that at least two current regulators are provided;
- and wherein each one of the two current regulators individually controls or regulates an output current at the branch associated therewith.

33. The circuit arrangement according to claim 32, wherein the main and supplementing currents are controlled or regulated by the two current regulators, and are supplied as the sum current to an output of the phase via an inductor having a tap.

34. A method for operating a circuit arrangement for feeding an electrically operated operating means having at least one winding, which circuit arrangement comprises a driving arrangement and comprises in at least one first phase:
- (a) a first branch of a first frequency converter operable at switching frequencies of not higher than 5 kHz, wherein a main alternating current generated at said switching frequencies is output to the at least one winding;
- (b) a second branch of another frequency converter operable at other switching frequencies of more than 5 kHz, wherein a supplementary alternating current generated at said other switching frequencies is output to the same winding;
- (c) wherein a current regulator for the supplementing current generated at the other switching frequency is provided for regulating or controlling a sum current receives a difference between a set current value of the first phase and a measured current at an output of the first branch;
- wherein, in the winding of the electrically operated operating means, the two alternating currents of the two branches are superimposed during parallel operation of the first and second branches.

35. The method according to claim 34, wherein an upper switching frequency of the first branch is at least ten times greater than a nominal frequency of the generated main alternating current.

36. The method according to claim 34, wherein the winding is a rotor or stator winding of a machine.

* * * * *

UNITED STATES PATENT AND TRADEMARK OFFICE
CERTIFICATE OF CORRECTION

PATENT NO. : 8,421,389 B2
APPLICATION NO. : 12/304793
DATED : April 16, 2013
INVENTOR(S) : Carsten Fraeger Page 1 of 1

It is certified that error appears in the above-identified patent and that said Letters Patent is hereby corrected as shown below:

Title page item (75) should read:

--(75) Inventor:  Carsten Fraeger, Hameln--

Signed and Sealed this
Twenty-first Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,421,389 B2
APPLICATION NO. : 12/304793
DATED : April 16, 2013
INVENTOR(S) : Carsten Fraeger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1087 days.

Signed and Sealed this
Eighth Day of September, 2015

Michelle K. Lee
*Director of the United States Patent and Trademark Office*